United States Patent [19]

Ramirez et al.

[11] 4,279,401
[45] Jul. 21, 1981

[54] APPARATUS AND METHOD FOR MAKING CAST OPHTHALMIC LENSES

[75] Inventors: Peter R. Ramirez, Southbridge; Bradford Canterbury, Sturbridge, both of Mass.

[73] Assignee: American Optical Corporation, Southbridge, Mass.

[21] Appl. No.: 154,670

[22] Filed: May 30, 1980

[51] Int. Cl.³ .............................................. B29D 11/00
[52] U.S. Cl. .................................. 249/139; 249/155; 249/157; 249/169; 264/1.8; 264/2.5; 425/808
[58] Field of Search .................... 425/808; 264/1, 225, 264/1.8, 2.5, 226; 249/168, 169, 139, 155, 157

[56] References Cited

U.S. PATENT DOCUMENTS

| 3,109,696 | 11/1963 | Whitney | 264/1 |
| 3,273,204 | 9/1966 | Craddock | 425/808 |
| 3,423,488 | 1/1969 | Bowser | 264/1 |
| 3,649,236 | 3/1972 | Rosenbauer | 264/1 |
| 3,946,982 | 3/1976 | Calking et al. | 425/808 |

Primary Examiner—James B. Lowe
Attorney, Agent, or Firm—Alan H. Spencer

[57] ABSTRACT

Cast multifocal lenses are produced from ledged casting pieces molded from a master die having a molding surface made up of juxtapositioned die components each precision surfaced to a curvature and finish corresponding to a multifocal surface desired to be cast upon a lens and relatively prearranged according to desired height and position of cast lens ledging.

14 Claims, 7 Drawing Figures

APPARATUS AND METHOD FOR MAKING CAST OPHTHALMIC LENSES

BACKGROUND OF THE INVENTION

1. Field of the Invention

Ophthalmic lens casting with particular reference to method and apparatus for making casting mold pieces.

2. Description of Prior Art

Methods of producing the traditional glass casting molds used in the manufacture of ledged multifocal lenses involve, in each case, either machining the mold from one piece of glass or fusing one or more sections of glass together or onto a preformed casting surface of a major mold component. U.S. Pat. Nos. 3,109,696; 3,460,928; and 3,555,126 are exemplary. These methods have serious drawbacks, i.e. in addition to the tediousness and high cost of fabrication, ledged glass molds suffer from fracture limitations and other mechanical shortcomings not expected of plastic molds.

Plastic casting molds produced from a single master die offer the advantage of accurate configurational duplication and economical replacement as needed.

Heretofore, however, master dies required for producing plastic multifocal casting molds were costly, tedious and difficult to manufacture. The problems and limitations experienced in making glass casting molds were similarly encountered. For example, considerable difficulty was found in producing acceptable multifocal ledge cornering and finish. Moreover, an entire line of dies offering a reasonable choice of lens distance viewing and reading portion power combinations has required an excessive number of master dies, e.g. 72 master dies were needed for supplying six distance viewing surface curvatures with twelve reading portion combinations, trifocal combinations excluded. Also, traditional mold or die making practices do not permit bringing multifocal ledge height to zero at the mold center.

In view of the above, this invention has an objective of facilitating the manufacture of cast ophthalmic lenses, more particularly by improvement in master molding dies from which molded plastic multifocal lens casting pieces may be made.

Another object is to provide a novel master die construction and method of making the same wherewith the present tediousness and costliness of die manufacture and inventory are overcome.

Another object is to provide means and method for making molded multifocal casting pieces and lenses cast therefrom of designs heretofore considered impractical, if not impossible, to produce, e.g. straight-line one-piece multifocals with zero ledge thickness at center may be made according to the invention.

Other objects and advantages of the invention will become more readily apparent from the following description.

SUMMARY OF THE INVENTION

The foregoing is accomplished according to the present invention by provision of a split-insert technique for making a master die component from which molded plastic multifocal lens casting mold pieces may be conveniently, economically and accurately reproduced as needed.

The master die molding surface is made up of juxtapositioned die components each precision surfaced to a particular curvature and finish corresponding to that of a multifocal surface desired to be finally cast by plastic casting pieces molded from the die.

With proper selection, juxtapositioning and securing together of die components having preselected molding surfaces and shapes, plastic casting pieces are molded against the assembled die components. With judicious selection of die components, great numbers of multifocal surface combinations can be provided with minimal die component inventory and expenditure. Also, with the advantage of mechanical positioning of die components, multifocal lens ledge height may be readily controlled and brought to zero at ultimate lens center, if desired.

Details of the invention will become more readily apparent from the following description when taken in conjunction with the accompanying drawings.

IN THE DRAWINGS

DESCRIPTION OF THE PREFERRED EMBODIMENTS

Figure 1:
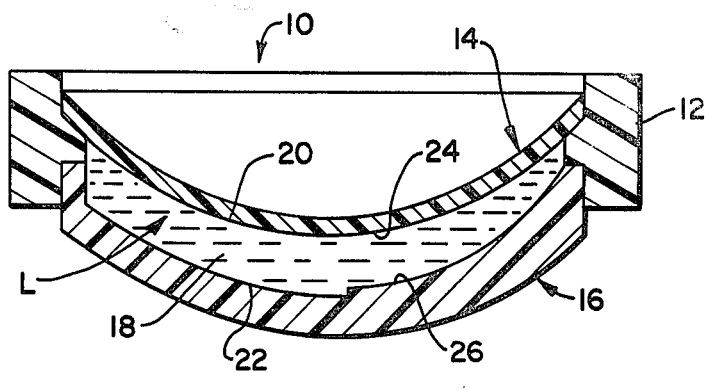
FIG. 1 is an illustration, in cross-section, of a lens casting cell incorporating a casting mold piece formed according to principles of the present invention.

Illustrated in the drawings is a multifocal lens casting cell 10 (FIG. 1) which comprises the usual resilient gasket 12 supporting mold pieces 14 and 16 between which a casting precursor 18 is injected for casting and curing to a lens shape having opposite sides 20 and 22 corresponding to facing sides 24 and 26 of pieces 14 and 16 respectively.

It being understood that the cell 10 components may be variously clamped together for avoiding leakage of precursor 18 prior to and during its curing, the assembly is placed and held in a mildly heated over (e.g. from 40° C. to 65° C.) for the period of time needed to at least partially cure (solidify) precursor 18, e.g. 10–20 hours.

When finally or partially cured, precursor 18 as cast lens L is "picked," i.e. removed from cell 10 by separation of its parts 12, 14 and 16. If required, final curing of lens L may be accomplished independently of cell 10 in a suitably heated oven.

The lens L material may be allyl diglycol carbonate, sold under the trademark CR-39 or another of the commonly used ophthalmic lens resins, examples of which may be found in U.S. Pat. No. 3,136,000 together with examples of typical curing times and temperatures. U.S. Pat. No. 3,821,333 may also be referred to for details of a typical gasket 12 construction and procedure for casting ophthalmic lenses.

Casting piece 14 of cell 10 may be conventionally formed of glass, metal or plastic and produces a side of lens L which is eventually finished by grinding and polishing. The crux of the present invention, however, lies in the construction of casting piece 16 and others similar thereto which are molded of plastic (e.g. nylon) and are particularly designed for ledged multifocal lens surface replication.

To this end, casting piece 16 is molded (e.g. by injection procedure) against a master die 28 (FIG. 2) which is illustrated in a position of use within a split injection molding head 30. A backing insert 32 and supporting sleeves 34, 36 complete the casting cavity 38 when head 30 is closed, as illustrated.

Sections 40 and 42 of head 30 are separable along line 3—3 for removal of articles formed in cavity 38 and changing or maintenance of die 28 and insert 32.

With the exception of master die 28, molding head 30 having injection inlet 44 is of conventional design requiring no further description.

Die 28, however, is uniquely designed to provide a positively curved (convex) molding surface 46 against which a negatively curved (concave) side of a lens casting piece 16 may be molded in cavity 38 so as to, in turn, form a positively curved side 22 of a cast lens L (FIG. 1). The shape of side 22 of lens L will correspond to the shape of surface 46 of die 28.

More particularly, die 28 is designed to facilitate the casting of lens surfaces having plural viewing fields, i.e. areas of different surface curvature, with a ledged separation therebetween of clean, sharp and uninterrupted edge contour. Such surfaces are referred to in the art as multifocal surfaces and may comprise the combination of two adjoining fields of different curvature (bifocal); three adjoining fields of different curvature (trifocal) as well as various sizes, arrangements and shapes of each as will become apparent from the following detailed description of FIGS. 2-7.

Figure 2:
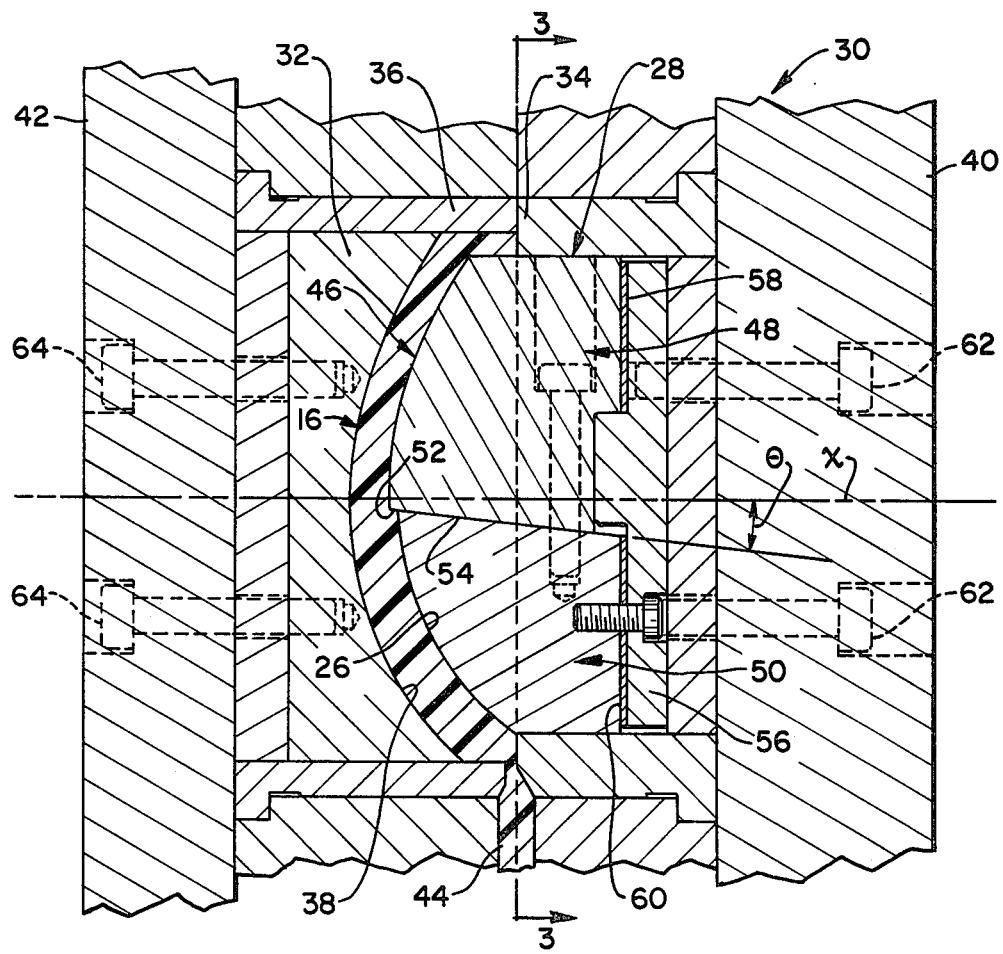
FIG. 2 is an illustration, also in cross-section, of molding apparatus incorporating master die means for producing lens casting pieces according to the invention.
Figure 3:
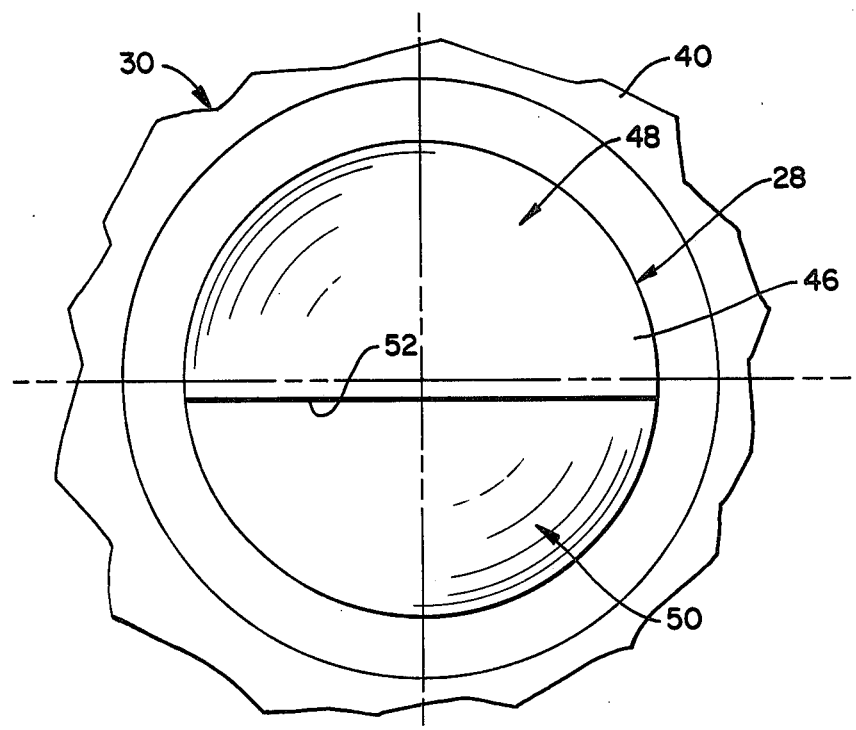
FIG. 3 is a face view of the master die means taken from line 3—3 in FIG. 2 looking in the direction of the arrows.

In FIGS. 2 and 3, master die 28, with two die pieces 48 and 50, is used for molding a bifocal surface on side 26 of casting piece 16. The bifocal surface has a ledged dividing line produced by step 52 extending across surface 46.

Step 52 is sharply cornered by separate machining, surface finishing and final juxtapositioning of die pieces 48 and 50.

Die piece 50, having a molding surface of shorter radius of curvature than the adjoining molding surface of die piece 48, produces step 52. Step 52 may be set to desired ledge height, including zero or near zero at its midpoint, by relative sliding adjustment of die pieces 48, 50 along their line of adjoinment 54 and selective shimming against base 56 (FIG. 1).

Die pieces 48 and 50 of die 28 are bolted together and to base 56 (e.g. as illustrated in FIG. 1) with shims 58 and 60 therebetween. Shims 58 and 60 may each comprise a single piece of conventional shim stock of appropriate thickness or layered stock making up the desired thickness.

Base 56 of die 28 is secured to section 40 of molding head 30 with bolt 62 and insert 32 is secured to section 42 with bolt 64 thereby completing the injection molding system of head 30 which, when closed as shown in FIG. 2, is adapted to receive a molding precursor through inlet 44.

Once the molding of casting piece 16 is accomplished, separation of sections 40 and 42 allow piece 16 to be removed for use in casting cell 10.

Either or both of die pieces 48 and 50 may be replaced by others having differently curved molding faces for producing various combinations of ledged multifocal casting surfaces on casting pieces 16 molded thereagainst.

In all cases of combinations of die pieces 48 and 50, their molding faces and adjoining sides along line 54 are provided with a finish corresponding to or superior to that expected of ophthalmic lenses ultimately cast from casting pieces 16. In cases where it may be desired to provide cast ophthalmic lenses with ledges having a textured finish for reflection-reduction purposes, the corresponding texture may be provided upon the surface of die piece 48 which adjoins die piece 50. Also, it should be noted that the line 54 of adjoinment of die pieces 48 and 50 is set at an angle $\theta$ of tilt (e.g. 5°) from the axis x of mold 28 to provide step 52 with a draft for facilitation of removal of a molded casting piece 16 and avoidance of edge damage to the ledge in casting piece 16. Draft angles of more or less than 5°, including zero draft, may be used.

Figure 4:
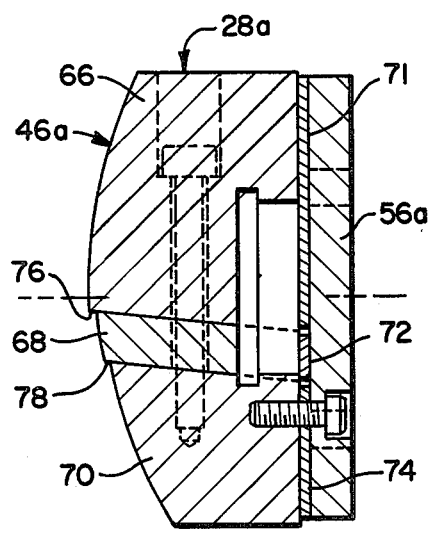
FIG. 4 is an illustration, in cross-section, of an alternative form of master die adaptable to the molding apparatus of FIG. 2.
Figure 5:
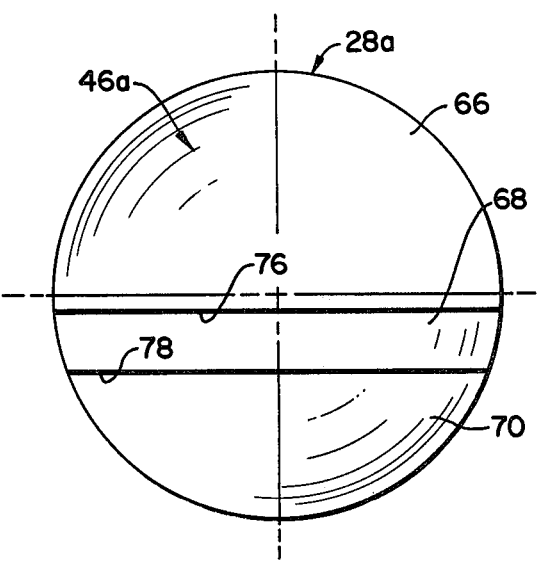
FIG. 5 is a face view of the die illustrated in FIG. 4.

The whole die 28 may also be replaced by one of different design, e.g. die 28a of FIGS. 4 and 5 having three bolted-together die pieces 66, 68 and 70 which produce a molding face 46a corresponding to that desired of the front surface of a ledged trifocal lens to be cast from a plastic casting piece molded against face 46a. Each of die pieces 66, 68 and 70 have a different molding surface curvature, e.g. surface 66 being of longest radius, surface 70 of shortest radius and surface 68 having an intermediate radius of curvature.

The bolted-together die pieces 66, 68 and 70 are further bolted to base 56a and separately shimmed with pieces 71, 72 and 74 according to desired height of steps 76 and 78. It should be understood that one or both of steps 76 and 78 may be brought to zero or near zero at their respective midpoints, if desired.

Figure 6:
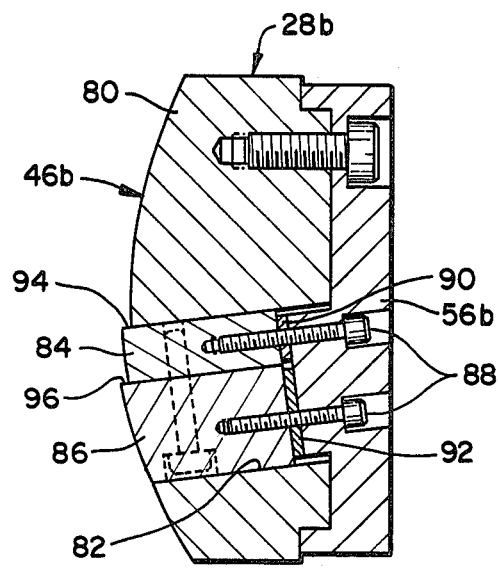
FIG. 6 is an illustration in cross-section of still another form of master die.
Figure 7:
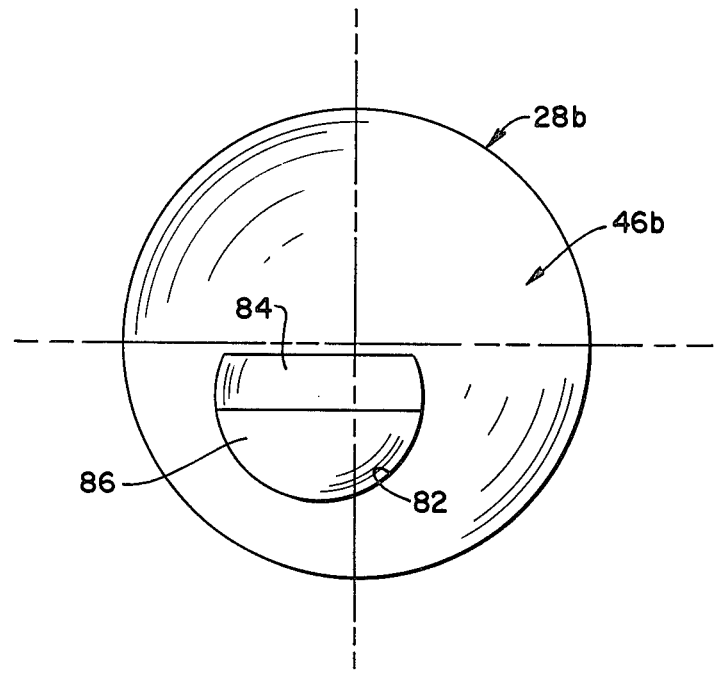
FIG. 7 is a face view of the die of FIG. 6.

Another embodiment of master die which may replace either of the above dies 28 and 28a is illustrated in FIGS. 6 and 7. This die 28b is used to produce casting pieces 16 from which ophthalmic lenses having the configuration of molding face 46b can be produced. This form of ophthalmic lens is well known in the art and is commonly referred to as a "flat top" trifocal.

Die 28b with base 56b comprises a major die piece 80 having a bore 82 into which the assembly of juxtapositioned die pieces 84 and 86 is fitted and anchored by screws 88. Bore 82 may be produced by conventional electro-forming process, for example.

Shims 90 and 92 are used to establish desired height of steps 94 and 96 and a draft angle for steps 94 and 96 is provided.

It should be understood that a single insert may be substituted for the assembly of die pieces 84 and 86 in cases where a "flat top" bifocal configuration is preferred for die 28b or another die of similar construction.

It is preferred, but not necessary, that the above die pieces 48, 50, 66, 68, 70, 80, 84, 86 and others referred to be formed of stainless steel.

The molding of lens casting pieces 16 with dies 28, 28a, 28b or variations thereof is preferably accomplished by injection of a suitable plastic material. An appropriate commercially available material is sold under the trademark Trogamid.

From the above, it can be seen that the ledge requirements of cast multifocal lenses are met according to the invention with minimum cost and complication. Provision is made for satisfying all combinations of multifocal surface curvatures with a minimum number of master die components, mechanical relative positioning of master die components permits ready selection of ultimate multifocal ledge height and uniquely permits production of zero ledge height at lens center if desired. Furthermore, accurate, rapid and economical casting piece replication is made possible, i.e. lens production demands for new and replacement casting pieces can be satisfied without the heretofore undue delay time of individual mold piece machining and hand-working. Additionally, casting piece inventory can be greatly reduced, damaged or otherwise spent casting pieces can be economically disposed of and replaced and the heretofore costly reconditioning and/or other maintenance of casting pieces is avoided.

The terms "lens" and "lenses" used herein are intended to include all of the various forms of ophthalmic optics whether with only one or both sides finally finished and/or of final edge shape or uncut (not edged), i.e. components known in the art as "lens blanks" are included.

It should be understood that various modifications and adaptations of the precise forms of the invention here shown and described may be made without departure from the scope of the invention. The above illustrations are, accordingly, not intended to be interpreted as restrictive of the inventions beyond that necessitated by the following claims.

We claim:

1. A molding die for making plastic casting pieces having ledged surfaces of particular curvature and relative juxtaposition according to multifocal lens focal field surfaces desired to be produced on ophthalmic lenses cast in said plastic pieces, said molding die comprising:
    a base;
    a pair of tightly juxtapositioned die pieces having adjoining curved molding surfaces together forming a molding face of said die, one of said molding surfaces being of shorter radius of curvature than the other, said difference of surface curvatures producing a ledge extending at least partially across said molding face of said die;
    means for securing said die pieces to said base; and
    means for shimming at least one of said die pieces on said base for adjustment of height of said ledging across said molding face.

2. A molding die according to claim 1 including a third die piece having a third molding surface of different curvature than either of said surfaces of said pair, said third piece being in tight juxtaposition with said pair of pieces and producing a second ledge on said molding face of said die, said third piece being secured to said base.

3. A molding die according to claim 2 including means for separately shimming said third die piece for adjustment of height of said second ledge.

4. A molding die according to claim 1 wherein said die pieces are provided with adjoining flat surfaces for effecting said tight juxtapositioning.

5. A molding die according to claim 4 wherein at least one of said flat surfaces is finished to a texture corresponding to that desired of said ledge.

6. A molding die according to claim 2 wherein said pair and third die pieces are provided with adjoining flat surfaces for effecting said tight juxtapositioning.

7. A molding die according to claim 6 wherein at least one of said flat surfaces of each adjoinment of said pair and third pieces is finished to a texture corresponding to that desired of said first-mentioned and second ledging.

8. A molding die according to claim 1 wherein said ledge is disposed at an acute angle to a central axis of said juxtapositioned die pieces.

9. A molding die according to claim 2 wherein said first-mentioned and second ledges on said molding face of said die are each disposed at an acute angle to a central axis through said juxtapositioned pair and third die pieces.

10. A molding die according to claim 1 wherein one of said pair of die pieces is provided with a bore extending through its curved molding surface and the other of said die pieces is tightly fitted with said bore.

11. A molding die according to claim 10 wherein said other die piece comprises a pair of juxtapositioned components having adjoining curved molding surfaces of different curvature than said curved molding surface of said one die piece, said molding surfaces of said pair of components being themselves of different curvatures.

12. A molding die according to claim 1 further including a supporting sleeve surrounding said juxtapositioned die pieces and base, said molding die and sleeve being adaptable to a half section of an injection molding head.

13. The method of making a ledged lens casting piece comprising the steps of:
    forming first and second master die components each having a finished curved surface and respectively adjoining finished sides, said surface of one of said components being of greater radius of curvature than the other;
    juxtapositioning said components by joining said surfaces thereof to form a composite molding face, said difference in curvatures of said surfaces of said components causing a portion of one of said finished sides to form a ledge across at least a portion of said molding surface; and
    molding a lens casting piece of plastic material against said molding face into which lenses may be subsequently cast.

14. The method according to claim 13 including the steps of:
    forming a third master die component having a finished curved surface and adjoining finished opposite sides, said surface of said third component having a curvature of a radius less than that of said first component and greater than that of said second component;
    disposing said third component between said first and second components with opposite sides thereof against respective similar sides of said first and second components and further with said finished curved surfaces of said first, second and third components providing a composite molding face; and
    causing portions of a finished side of said third component and a finished side of one of said first and second components to each form a ledge across at least a portion of said composite molding face.

* * * * *